US012607153B2

(12) United States Patent
Mook et al.

(10) Patent No.: US 12,607,153 B2
(45) Date of Patent: Apr. 21, 2026

(54) SYSTEMS AND METHODS FOR REDUCING EMISSIONS

(71) Applicant: General Electric Company, Schenectady, NY (US)

(72) Inventors: Joshua Tyler Mook, Cincinnati, OH (US); Zachary William Nagel, Liberty Township, OH (US); Mohammed El Hacin Sennoun, West Chester, OH (US); Kevin Michael Vandevoorde, Cincinnati, OH (US); Mary Kathryn Thompson, Hamilton, OH (US)

(73) Assignee: General Electric Company, Evendale, OH (US)

( * ) Notice: Subject to any disclaimer, the term of this patent is extended or adjusted under 35 U.S.C. 154(b) by 78 days.

(21) Appl. No.: 16/868,992

(22) Filed: May 7, 2020

(65) Prior Publication Data

US 2020/0355132 A1 Nov. 12, 2020

Related U.S. Application Data

(60) Provisional application No. 62/844,166, filed on May 7, 2019.

(51) Int. Cl.
*F02M 26/15* (2016.01)
*F02D 41/00* (2006.01)
(Continued)

(52) U.S. Cl.
CPC ......... *F02D 41/0052* (2013.01); *F02M 26/15* (2016.02); *F02M 26/46* (2016.02); (Continued)

(58) Field of Classification Search
CPC ............ F01N 2250/04; F01N 2270/04; F01N 2430/06; F01N 2560/025; (Continued)

(56) References Cited

U.S. PATENT DOCUMENTS 2,829,731 A 4/1958 Clayton
3,131,533 A 5/1964 Vandenberg
(Continued)

FOREIGN PATENT DOCUMENTS

CN 108816020 * 11/2018
JP 04-153518 * 5/1992
WO WO9307365 A1 4/1993

*Primary Examiner* — Erick R Solis
(74) *Attorney, Agent, or Firm* — Dinsmore & Shohl LLP

(57) ABSTRACT

A system for reducing emissions from an internal combustion engine includes a combustion chamber having an inlet and an outlet, a fuel delivery device for delivering fuel to the combustion chamber, and a control system for controlling a fuel to oxidizer ratio in the combustion chamber. A method of reducing emissions from an internal combustion engine includes the steps of: establishing a flow of oxygen-containing gas through a combustion chamber having an inlet and an outlet; introducing flow of fuel into the combustion chamber; igniting the fuel in the combustion chamber; operating an internal combustion engine to develop a stream of exhaust gas; introducing a flow of the exhaust gas into the combustion chamber; and controlling the flow of exhaust gas and the flow of fuel to minimize oxygen levels in exhaust gases downstream of the outlet.

24 Claims, 14 Drawing Sheets

(51) Int. Cl.
*F02M 26/46* (2016.01)
*F01N 3/20* (2006.01)
*F02M 26/00* (2016.01)

(52) U.S. Cl.
CPC .......... *F01N 3/208* (2013.01); *F01N 2270/04* (2013.01); *F01N 2430/06* (2013.01); *F01N 2560/025* (2013.01); *F01N 2900/1402* (2013.01); *F02M 2026/009* (2016.02)

(58) Field of Classification Search
CPC ............. F01N 2900/1402; F01N 3/208; F01N 2240/14; F01N 2250/06; F02D 41/0052; F02M 2026/009; F02M 26/15; F02M 26/46
USPC .................................... 60/286, 287, 289, 303
See application file for complete search history.

(56) References Cited

U.S. PATENT DOCUMENTS 3,209,531 A 10/1965 Morris et al.
3,444,687 A * 5/1969 Andersson ................ F01N 3/10 181/259
3,793,830 A * 2/1974 August ................. F01N 3/2053 422/171
5,224,334 A * 7/1993 Bell ........................ F23C 13/00 423/239.1
6,779,339 B1 8/2004 Laroo et al.
7,121,081 B2 10/2006 Wirkus et al.
7,377,102 B2 5/2008 Roach et al.
2006/0101810 A1 5/2006 Angelo et al.
2007/0227125 A1* 10/2007 Robertson ............... F23N 5/003 60/285
2008/0060627 A1* 3/2008 Bromberg ........... F02D 19/0655 123/575
2009/0178389 A1* 7/2009 Crane, Jr. ............... F01N 3/025 60/303
2009/0180937 A1* 7/2009 Nohl ..................... F01N 3/2033 422/176
2011/0045422 A1* 2/2011 Tanca ..................... F23J 15/022 431/76
2011/0203261 A1* 8/2011 Kotrba .................. F01N 3/2066 60/299
2013/0186074 A1* 7/2013 Kanba ..................... F02B 37/00 60/286
2013/0227934 A1* 9/2013 Zagone ................... F01N 3/025 60/303
2014/0114619 A1* 4/2014 Sampath ................. G06F 30/20 703/1
2015/0007562 A1* 1/2015 Morishima ........... F01N 3/2033 60/600
2017/0234184 A1* 8/2017 Norton .................... F01N 3/206 60/274
2018/0230882 A1* 8/2018 Ghoniem ................ F01N 3/043
2018/0355777 A1* 12/2018 Stanavich ............... F01N 3/025
2020/0102874 A1* 4/2020 Kurtz .................. F02D 41/1441
2022/0090566 A1* 3/2022 Magnusson ............ F02M 26/06

* cited by examiner

Effects of A/F Ratio on Exhaust NOx

Exhaust NOx production is highest when A/F ratio is slightly leaner than "ideal". This inverse relationship with HC and CO production poses a problem when attempting to lower all three emission levels at once.

SYSTEMS AND METHODS FOR REDUCING EMISSIONS

PRIORITY CLAIM

This application claims priority to U.S. Patent Application No. 62/844,166, filed May 7, 2019, which is incorporated herein by reference in its entirety.

BACKGROUND OF THE INVENTION

Internal combustion engines are utilized in many facets of daily life and find applications in both stationary installations and moving vehicles of various sorts. From portable generators and pumping stations, to on- and off-road trucks, ships, and railroad locomotives, internal combustion engines provide the power to produce useful work in all of these applications.

Typically powered by hydrocarbon fuels such as kerosene, diesel fuel, jet fuel, gasoline, and propane, these internal combustion engines take in an oxidizer, such as oxygen-containing atmospheric air, combine it with fuel, generate energy and useful work through a combustion process in a combustion chamber, and then exhaust byproducts of the combustion process to the atmosphere.

Internal combustion engines generate exhaust byproducts including those that are benign, such as water vapor, as well as those which may have negative implications, such as nitrogen oxides (NOx), sulfur oxides (SOx), and others. It is often desirable to minimize the quantity of negative byproducts emitted. However, despite many efforts to develop systems to control, reduce, or eliminate such byproducts, there remains a need for an improved system for reducing these byproducts and methods for accomplishing such a reduction.

BRIEF DESCRIPTION OF THE INVENTION

In one aspect, a system for reducing emissions from an internal combustion engine includes a combustion chamber having an inlet and an outlet, a fuel delivery device for delivering fuel to the combustion chamber, and a control system for controlling a fuel to oxidizer air ratio in the combustion chamber.

In another aspect, an internal combustion engine having reduced emissions output includes an internal combustion engine having an air intake system and an exhaust gas system, a fuel source for providing fuel to the internal combustion engine, and a system for reducing emissions from the exhaust gas system of the internal combustion engine. The system includes a combustion chamber having an inlet and an outlet, a fuel delivery device located within the combustion chamber, and a control system connected to the delivery device for regulating an amount of fuel to be dispensed into the combustion chamber to minimize oxygen levels in exhaust gases at the outlet.

In another aspect a vehicle having reduced emissions output includes an internal combustion engine and a system for reducing emissions from the internal combustion engine. The system includes a combustion chamber having an inlet and an outlet, a fuel delivery device for delivering fuel to the combustion chamber, and a control system connected to the fuel delivery device for regulating an amount of fuel to be delivered to the combustion chamber to minimize oxygen levels in exhaust gases at the outlet.

In yet another aspect, a method of reducing emissions from an internal combustion engine includes the steps of: establishing a flow of oxygen-containing gas through a combustion chamber having an inlet and an outlet; introducing flow of fuel into the combustion chamber; igniting the fuel in the combustion chamber; operating an internal combustion engine to develop a stream of exhaust gas; introducing a flow of the exhaust gas into the combustion chamber; and controlling the flow of exhaust gas and the flow of fuel to minimize oxygen levels in exhaust gases downstream of the outlet.

In another aspect, a method of reducing emissions from an internal combustion engine includes the steps of: establishing a flow of oxygen-containing gas through a combustion chamber having an inlet and an outlet; introducing flow of fuel into the combustion chamber; igniting the fuel in the combustion chamber; operating an internal combustion engine to develop a stream of exhaust gas; introducing a flow of the exhaust gas into the combustion chamber; and controlling the flow of exhaust gas and the flow of fuel to minimize oxygen levels in exhaust gases downstream of the outlet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION OF THE INVENTION

Figure 1:
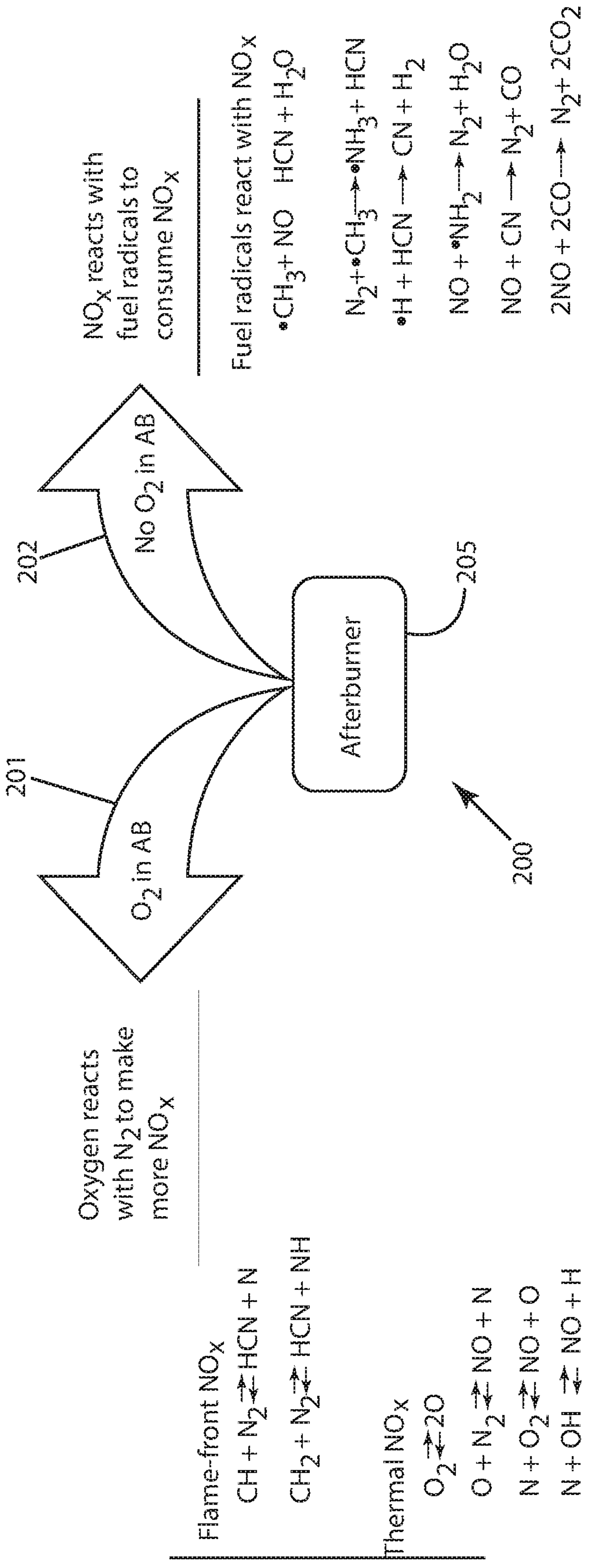
FIG. 1 is a conceptual illustration of the principle of operation of an exemplary embodiment of the system described herein.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

The described embodiments of the present invention are directed to systems and methods for reducing emissions, such as NOx, SOx, and other emissions. For purposes of illustration, the present invention will be described with respect to an internal combustion engine suitable for use in a land vehicle such as an over-the-road truck. It will be understood, however, that the invention is not so limited and may have general applicability, including other mobile and non-mobile industrial, commercial, military, and residential applications such as aircraft, ships, railroad locomotives, off-road vehicles, and stationary powerplants.

As used herein, the term “forward” or “upstream” refers to moving in a direction toward the system inlet, or a component being relatively closer to the system inlet as compared to another component. The term “aft” or “downstream” used in conjunction with “forward” or “upstream” refers to a direction toward the rear or outlet of the system or being relatively closer to the system outlet as compared to another component.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader’s understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The terms “coupled,” “fixed,” “attached to,” and the like refer to both direct coupling, fixing, or attaching, as well as indirect coupling, fixing, or attaching through one or more intermediate components or features, unless otherwise specified herein.

The singular forms “a”, “an”, and “the” include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as “about”, “approximately”, and “substantially”, are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

FIG. 1 is a conceptual illustration of the principle of operation of an exemplary embodiment of the system described herein. Internal combustion engines, such as reciprocating diesel engines, produce combustion byproducts which are typically exhausted to ambient and combine with other gases in the atmosphere. Some byproducts are benign in nature, such as water vapor, while others such as NOx, may have negative implications in large quantities in the atmosphere.

In the context of the present disclosure, it has been noted that the presence of oxygen in the exhaust gas stream from the internal combustion engine contributes to the formation of NOx. While some emission reduction systems have been developed in the past which incorporate a secondary combustion chamber, or afterburner, downstream of the internal combustion engine (with its one or more internal combustion chambers), such systems have not addressed the principle illustrated in FIG. 1. Early systems focused on addressing the emission requirements of so-called “rich burn” engine configurations, possibly due to the predominance of carburetor architectures for gasoline-powered engines. In the era before the rise of computerized engine control systems, these engines were configured to run under a variety of atmospheric and operating conditions and could not be optimized for all scenarios. Under many operating conditions, unburned fuel (hydrocarbons) were released through the exhaust into the atmosphere. Hence, early emission reduction systems focused on consuming this unburned fuel which was not fully utilized in the primary combustion chamber(s) through afterburning technologies, some of which actually introduced additional air and/or oxygen into the exhaust stream for use in the afterburner. Some afterburning systems focused not on consuming unburned fuel, but on generating a sufficient temperature in the exhaust gas for other intents and purposes.

In today's world, with the increasing prevalence of diesel engines as the internal combustion engine of choice and increasing focus on fuel economy, many internal combustion engines have migrated to the so-called "lean burn" end of the spectrum. This in turn gives rise to different emission regimes and different options and opportunities to reduce or eliminate undesirable emissions. Today's diesel engines, in particular, are an inherently lean combustion process in contrast to the prior, inherently rich combustion processes of the past.

In FIG. 1, an emission reduction system 200 which includes a secondary combustion chamber, or afterburner, 205 is shown conceptually and two possible exit conditions are depicted. In the first exit condition, 201, oxygen at some level above zero, which enters the afterburner from the internal combustion engine exhaust, remains at the exit of the afterburner. As illustrated in FIG. 1, such residual oxygen reacts with nitrogen which is also present to form more NOx than was initially exhausted by the internal combustion engine, resulting in a net increase in NOx present in the exhaust stream. However, in the second exit condition, 202, the oxygen level is essentially zero at the exit of the afterburner due to residual oxygen in the exhaust stream having been consumed within the afterburner 205. Desirable oxygen levels would include zero as well as sufficiently low levels as to not impact NOx, such as less than about 1%, and more particularly less than about 0.1%. This afterburning combustion process causes NOx molecules to react with fuel radicals to actually consume NOx, rather than producing more NOx as a combustion byproduct, and thereby reduce or eliminate NOx in the exhaust stream from the emission reduction system or afterburner 200. Hence, a carefully controlled secondary combustion process in a secondary combustion chamber has the potential to reduce, if not eliminate, NOx in an exhaust stream from an internal combustion engine, and, in particular, a lean burn internal combustion engine.

Measuring oxygen content is useful in determining the fueling level required in the afterburner 205. However, this may result in over-fueling the afterburner because once a fueling level is sufficient to achieve a zero, or essentially zero, oxygen level, adding more fuel continues to result in a zero, or essentially zero, oxygen level. It may be useful to additionally combine another sensed parameter, such as carbon dioxide (CO2), in a control scheme to define an upper limit of fueling.

A more detailed discussion of interactions between oxygen and NOx may be found in the United States Environmental Protection Agency (EPA) Summary Report entitled "Control of NOx Emissions by Reburning", EPA/625/R-96-001, February 1996, which is hereby incorporated herein by reference.

Reductions in oxygen levels in an exhaust stream may also be helpful in reducing SOx and other undesirable emissions. While in some regions the sulfur content of fuels has been reduced, in an effort to reduce SOx emissions, in other regions and circumstances some fuels may contain higher levels of sulfur. Systems which rely on noble metal catalysts may be negatively impacted by the presence of higher levels of sulfur in fuels and exhaust streams. Hence the design and operation of a system which is less reliant on noble metals may be less impacted by the presence of sulfur and achievable reductions in oxygen levels in the exhaust stream may reduce SOx formation even in the presence of comparatively higher levels of sulfur in the input fuel.

Figure 2:
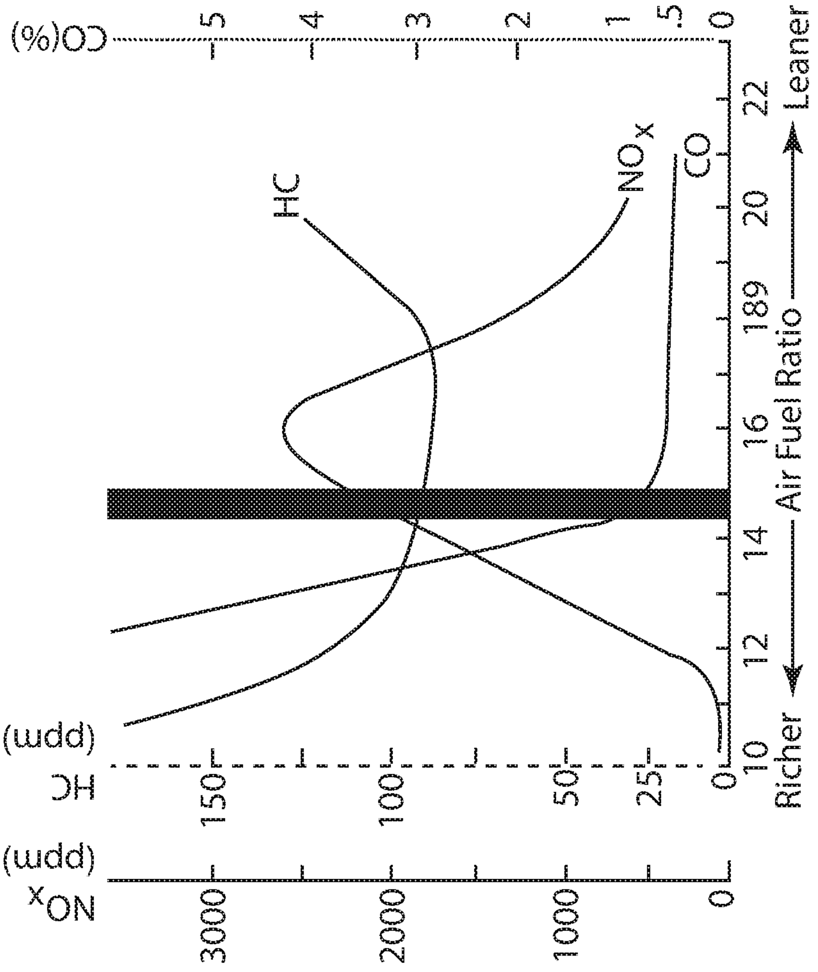
FIG. 2 is a graphical illustration of the effects of air/fuel (AF) ratio on exhaust NOx.

FIG. 2 a graphical illustration of the effects of air/fuel ratio (AFR) on exhaust NOx. As shown in FIG. 2, hydrocarbon (HC) and carbon monoxide (CO) levels are relatively low near the theoretically ideal AFR, which for some fuels such as gasoline may be 14.7 to 1 but for other fuels it may be a different value such as 14.5 to 1 for diesel fuel. This reinforces the need to maintain strict air/fuel mixture control. However, as also shown in FIG. 2, NOx production is very high at an AFR just slightly leaner than the ideal air/fuel mixture range. This inverse relationship between HC/CO production and NOx production creates a challenge when seeking to control total emission output from the combustion process. It also illustrates the complexity in simultaneously seeking to reduce all three of these emission products. Starting with a lower (i.e., leaner) AFR generally produces more NOx, which creates more of a challenge to remove from the exhaust stream. Alternatively, starting with a higher (i.e., richer) AFR generally produces more HC/CO, which creates a challenge to remove those pollutants from the exhaust stream—additionally, HC emissions represent an undesired fuel efficiency penalty.

Figure 3:
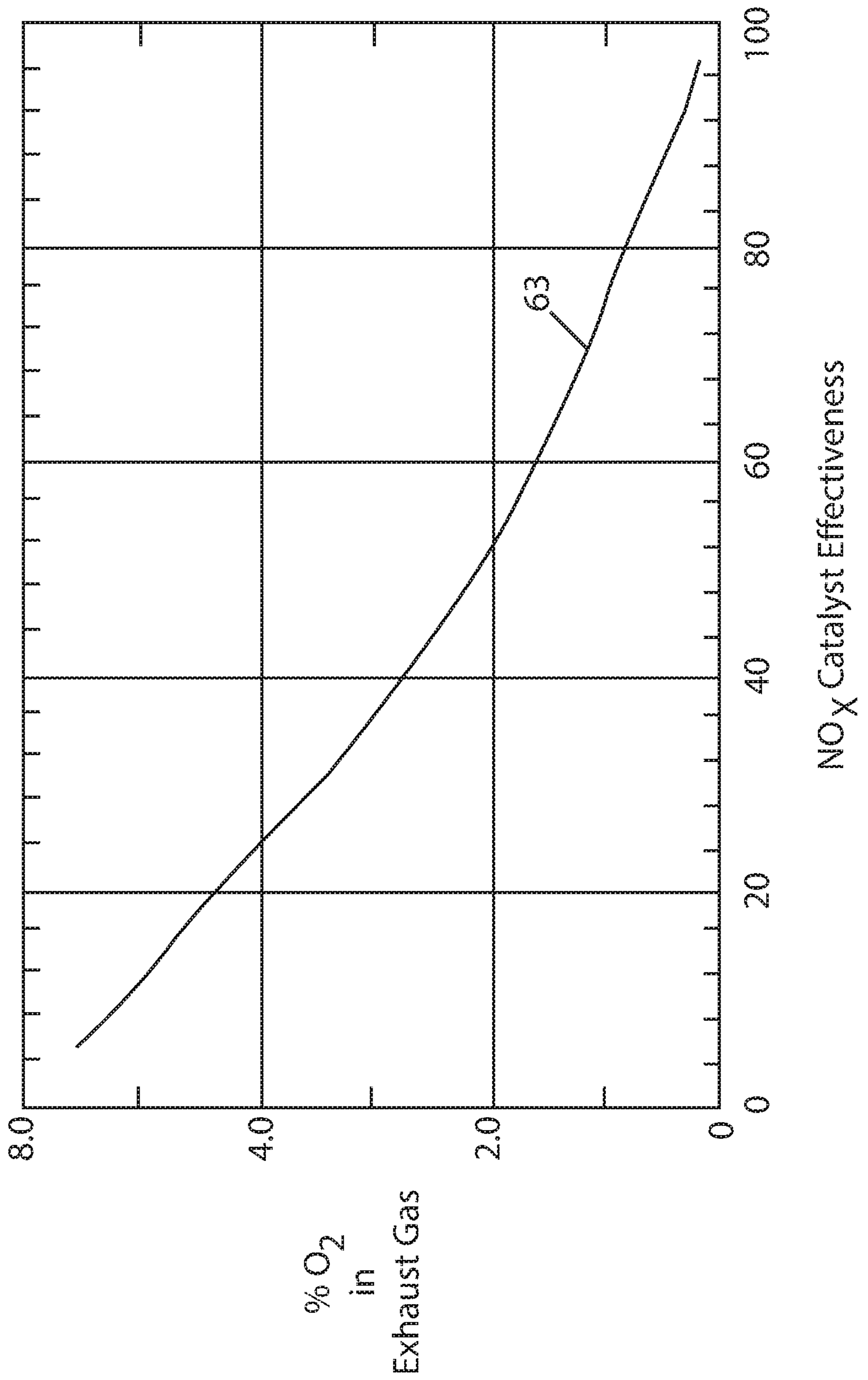
FIG. 3 is a graphical illustration of the effect of the percent of oxygen in exhaust gas to NOx catalyst effectiveness.

FIG. 3 is a graphical illustration of the effect of the percent of oxygen in exhaust gas to NOx catalyst effectiveness as a percentage. As shown in FIG. 3, these two properties are generally inversely related, such that the effectiveness of NOx catalysts tends to increase as the amount of oxygen present in the exhaust gases decreases. Therefore, in many types of emission reduction systems a reduction in oxygen levels enhances system effectiveness in controlling or eliminating NOx.

Figure 4:
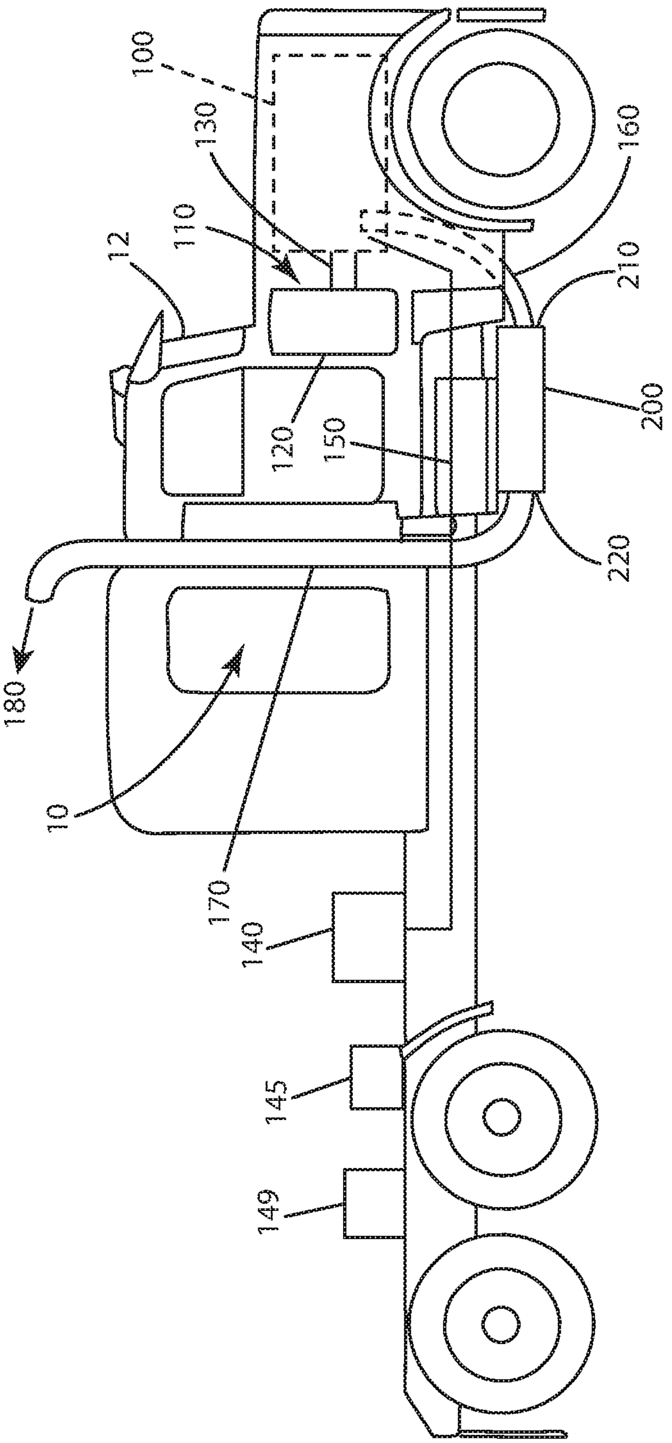
FIG. 4 is an illustration of an exemplary installation of the system of FIG. 1 in a land vehicle.

FIG. 4 is an illustration of one example of an application for an emission reduction system and method as described herein. In FIG. 4, a vehicle such as a land vehicle 10 in the form of an over-the-road truck 12 is illustrated. Vehicle 10 includes an internal combustion engine 100, such as a reciprocating diesel engine, which draws atmospheric intake air 110 through an inlet filter 120 and through an intake manifold 130 to feed air into the internal combustion engine 100. After combustion takes place within the internal combustion chambers, exhaust gases exit the internal combustion engine 100 through an exhaust manifold and pass through an exhaust pipe 160 which connects to the inlet 210 of the emission reduction system 200. The outlet 220 of the emission reduction system 200 then connects to an exhaust stack 170, which may include a muffler, which then emits the exhaust gases 180 to the atmosphere at ambient conditions. Fuel for the internal combustion engine 100 may be stored in a fuel tank 140 and be fed through a fuel line 150 to the internal combustion engine 100 and, optionally, to the emission reduction device 200 as well. In other configurations, emission reduction system 200 may draw fuel from another source such as a second, separate fuel tank 145. Also shown is an optional tank 149 for Diesel Emission Fluid (DEF), urea, or other suitable exhaust additives which may be utilized.

Figure 5:
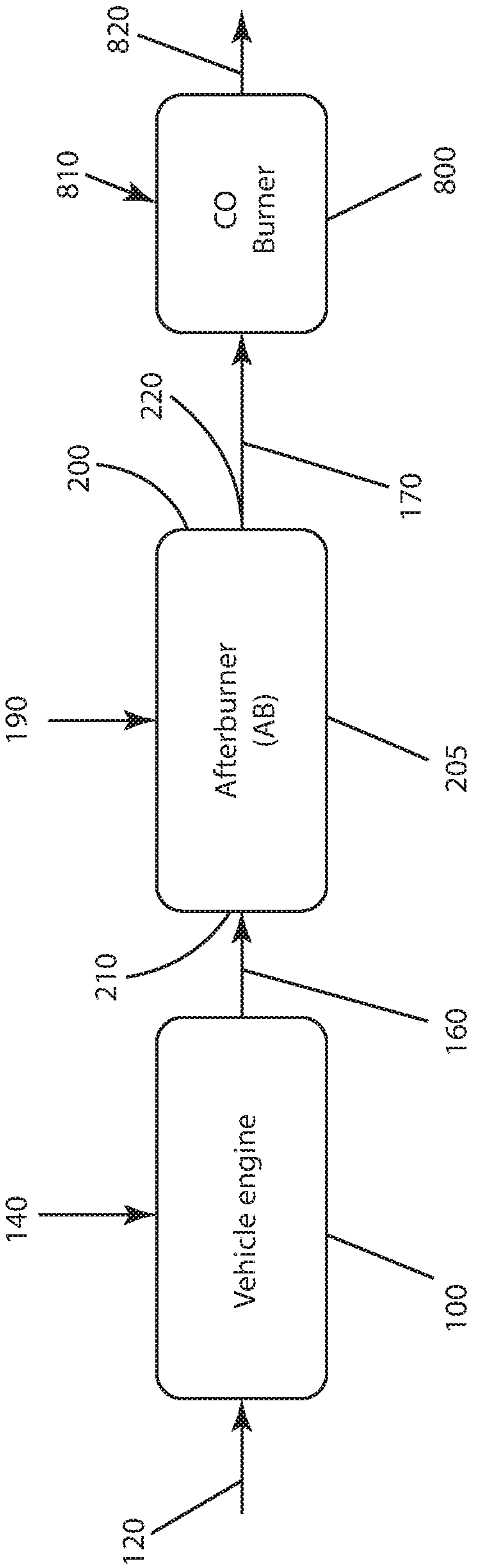
FIG. 5 is a schematic diagram of an exemplary embodiment of the system described herein installed with an internal combustion engine.

FIG. 5 illustrates schematically one configuration of such an emission reduction system 200. In this configuration, the emission reduction system 200 takes the form of a secondary combustion chamber, or afterburner, 205, which has an inlet 210 in flow communication with the exhaust pipe 160 from the internal combustion engine 100. Fuel, other engine products such as crankcase ventilation purge, and optionally air are fed into the afterburner at 190 where a secondary combustion process takes place to consume all available oxygen in the gas stream and reduce the level of available oxygen to zero. As previously discussed with respect to FIG. 1, this leads to reaction of NOx with fuel radicals, or amino radicals (NH2) if present from auxiliary inputs such as DEF or urea, to consume NOx and deliver an exhaust stream at the outlet 220 of the afterburner 200 which has very low, or zero, levels of NOx therein.

Also shown in FIG. 5 is an additional component 800 in the form of a carbon monoxide (CO) burner which infuses supplemental oxygen 810 to perform what may be called "CO-burnout" and deliver an exhaust stream with reduced CO levels. This can be helpful when certain emission control components and processes tend to produce higher CO levels than desirable. By injecting additional oxygen (or oxygen-containing gas such as air) downstream of the afterburner 205, while temperatures of the exhaust stream are still high (usually in excess of about 1,400 degrees F.), since NOx has been removed from the exhaust stream the injection of oxygen will not impact NOx reduction and will serve to provide oxygen molecules to react the CO to form carbon dioxide (CO2). In stationary powerplants, this would be termed "over-fire air" in vertically-oriented burners.

Figure 6:
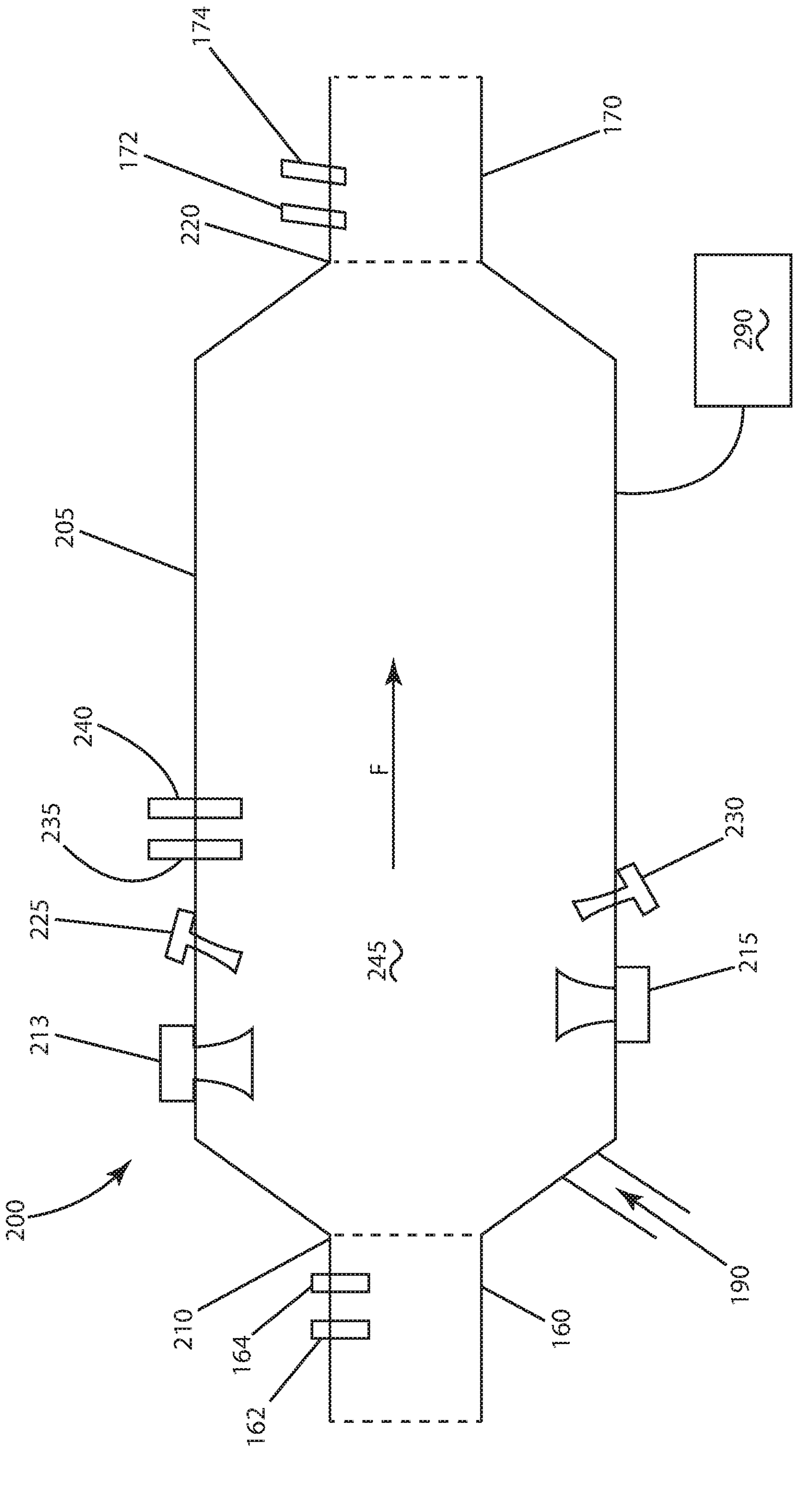
FIG. 6 is a cross-sectional view of an exemplary afterburner suitable for use in a system as described herein.

FIG. 6 is a simplified cross-sectional illustration of an exemplary embodiment of an afterburner 205 which may be incorporated into an emission reduction system 200. As shown in FIG. 6, the afterburner 205 has an inlet 210 which receives exhaust gas flow from an exhaust pipe 160 from the upstream internal combustion engine 100. At or adjacent to the inlet 210, one or more sensors such as sensors 162 and 164 may be included for sensing parameters in the exhaust gas flow which will be discussed in more detail subsequently. The afterburner 205 also has an outlet 220 which leads to exhaust pipe 170 which leads to the atmosphere 180 at ambient conditions. As is the case with the inlet 210, at or adjacent to the outlet 220, one or more sensors such as sensors 172 and 174 may be included for sensing parameters in the exhaust gas flow which will be discussed in more detail subsequently.

The afterburner 205 of FIG. 6 defines an internal, secondary combustion chamber 245 which is flow-wise downstream of the primary combustion chamber(s) of the internal combustion engine 100. Secondary combustion chamber 245 includes several elements which support and control operation of the afterburner 205. An inlet 190 may be provided to facilitate the introduction of air, oxygen, emissions from the internal combustion engine such as crankcase vapors, and the like, into the secondary combustion chamber 245. A flow of exhaust gases proceeds generally in the direction of arrow F from inlet 210 to outlet 220. One or more fuel nozzles or injectors 213, 215, may be utilized to provide combustible fuel into the combustion chamber 245. Other suitable methods of fuel introduction may include introducing fuel just upstream of the combustion chamber, or utilizing a pre-mixing device or chamber to deliver a pre-mixed fuel/air stream into the combustion chamber. Fuel from nozzles or injectors 213, 215, may be ignited by one or more ignitors 225, 230, and the combustion process within secondary combustion chamber 245 may be monitored by one or more sensors 235, 240. Fuel nozzles or injectors 213, 215, may be of any suitable design or construction suitable for the fuel type, fuel flow, and atomization characteristics needed to operate the afterburner 205. It may also be possible or desirable to pre-mix fuel with the incoming flow. Ignitors 225, 230, may likewise be of any suitable design or construction suitable for the fuel type, fuel flow, and ignition characteristics of the fuel used and the fuel/air ratios associated with operation of the afterburner 205. In some configurations, it may be possible and/or desirable to integrate ignition devices such as ignitors 225, 230 into the fuel delivery devices, such as fuel nozzles or injectors 213, 215.

Sensors employed upstream of, downstream of, or within the afterburner 205 may be sensors of any suitable and/or conventional design for measuring parameters such as oxygen level, NOx level, temperature, mass flow, noise, carbon dioxide level, or any other parameter useful for appropriately controlling the operation of the afterburner 205.

Fuels provided to the secondary combustion chamber 245 through nozzles 213, 215, may be a hydrocarbon fuel in liquid or gaseous form such as diesel fuel, gasoline, kerosene, jet fuel, propane, liquefied or compressed natural gas, or hydrogen, and may be the same fuel utilized for primary combustion in the internal combustion engine 100 or may be a different fuel. It is also possible to utilize more than one type of fuel in afterburner 205, such as through use of a plurality of fuel nozzles or injectors.

The afterburner 205, and more particularly the secondary combustion chamber 245, is designed, sized, and configured so as to provide sufficient interior volume and travel distance to constitute a reaction chamber for the oxygen-consuming process therein to take place. The bulk flow rate of the exhaust gases through the secondary combustion chamber 245 is such that sufficient dwell time exists in the reaction zone. Dwell time may be determined for a particular flow rate and operating conditions, and may be, for example, on the order of about 10 to 20 milliseconds, or between single to hundreds of milliseconds. To measure the effectiveness of the afterburner 205, therefore, sensors should be located at or after the conclusion of the reaction domain to ensure detection of the desired zero, or essentially zero, oxygen levels discussed previously. This may be a location within the secondary combustion chamber 245, or at the outlet 220, for example, or downstream of any additional or supplemental components or processes.

The design of the secondary combustion chamber may be any of a number of suitable configurations and combinations of fuel delivery devices and chamber designs. Some examples include ceramic surface stabilized flames, swirl-stabilized flames, stagnation-point reverse flow, and counter-rotating mixer designs. Many ultra-lean combustors that would be well-suited to an oxygen-consuming afterburner as described herein could benefit from additive manufacturing techniques.

Figure 7:
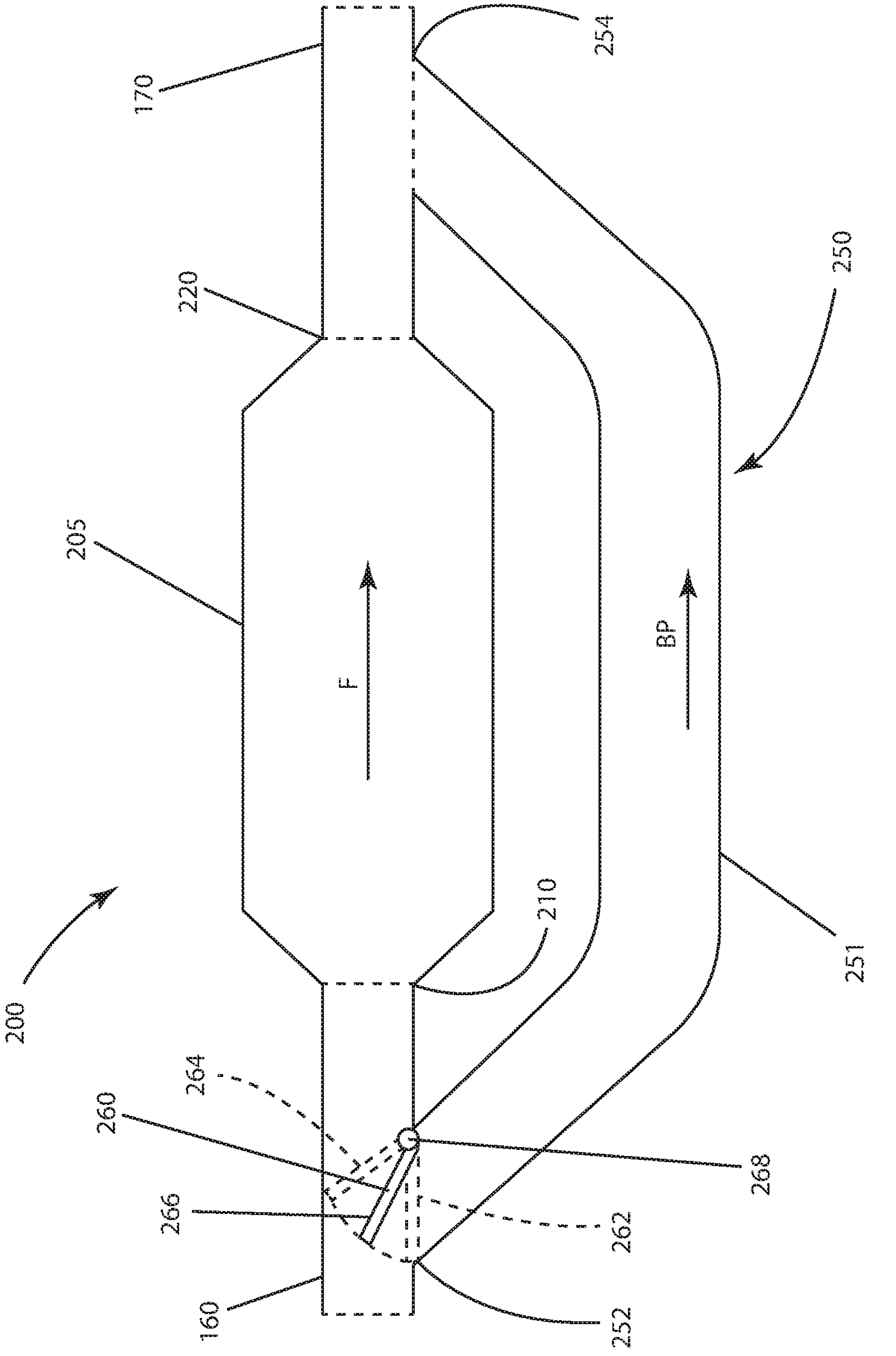
FIG. 7 is a cross-sectional view of the afterburner of FIG. 6 in conjunction with an exemplary bypass system.

FIG. 7 illustrates a cross-sectional view of the afterburner of FIG. 6 in conjunction with an exemplary bypass system denoted generally by reference numeral 250. Bypass system 250 enables all or, or a portion of, the exhaust gas stream to bypass the secondary combustion chamber 245 in afterburner 205 to accommodate various operating needs or conditions, including system startup. Bypass system includes a bypass pipe or duct 251 which is connected at one end 252 to the exhaust pipe 160, which delivers exhaust gas from the internal combustion engine 100, and at the other end 254 to the exhaust stack 170 which leads to the atmosphere 180 at ambient conditions. Bypass pipe 251 is therefore in flow communication with both exhaust pipe 160 and exhaust stack 170, and flow into bypass pipe 251 (indicated by the arrow identified as BP) may be selectively controlled by a valve 260. Valve 260 may be any suitable type of flow control device, such as a valve or other mechanism, suitable for metering flow into either or both of two diverging ducts. Flow control valve 260 may be a pivoting flap valve, as depicted in FIG. 7, which is capable of pivoting about a pivot point 268. Flow control valve 260 is capable of pivoting from a full-bypass position 264, where flow to afterburner 205 is fully obstructed, to a full-afterburner position 262, where flow to the bypass pipe 251 is fully obstructed, or to any intermediate position such as position 266. Positions 262 and 264 are shown in phantom while position 266 is shown in solid lines.

Flow control valve 260 may be controlled by a control system 290 which integrates sensor inputs and controls exhaust flow, fuel flow, ignition, and other functions of the emission reduction system 200. Control of the bypass system 250 may be controlled by sensor data related to the operation of the internal combustion engine 100, the states of the fuel tanks, and the external environment, as well as sensor data pertaining to the emission reduction system 200 which includes the afterburner 205.

Emission reduction system 200 may be designed and constructed as a modification package, or aftermarket kit, which is retrofittable to an internal combustion engine in addition to or instead of any exhaust system components already in place. Alternatively, emission reduction system 200 may be designed and constructed as an integral part of the internal combustion engine and its associated exhaust system components. In either configuration, the emission reduction system 200 may be configured to operate autonomously based on a pre-programmed set of operating characteristics programmed into a stand-alone control system 290 or it may be configured to operate in concert with (or be incorporated into) an engine control system which controls the operation of the internal combustion engine and/or a vehicle in which it is installed.

Figure 8:
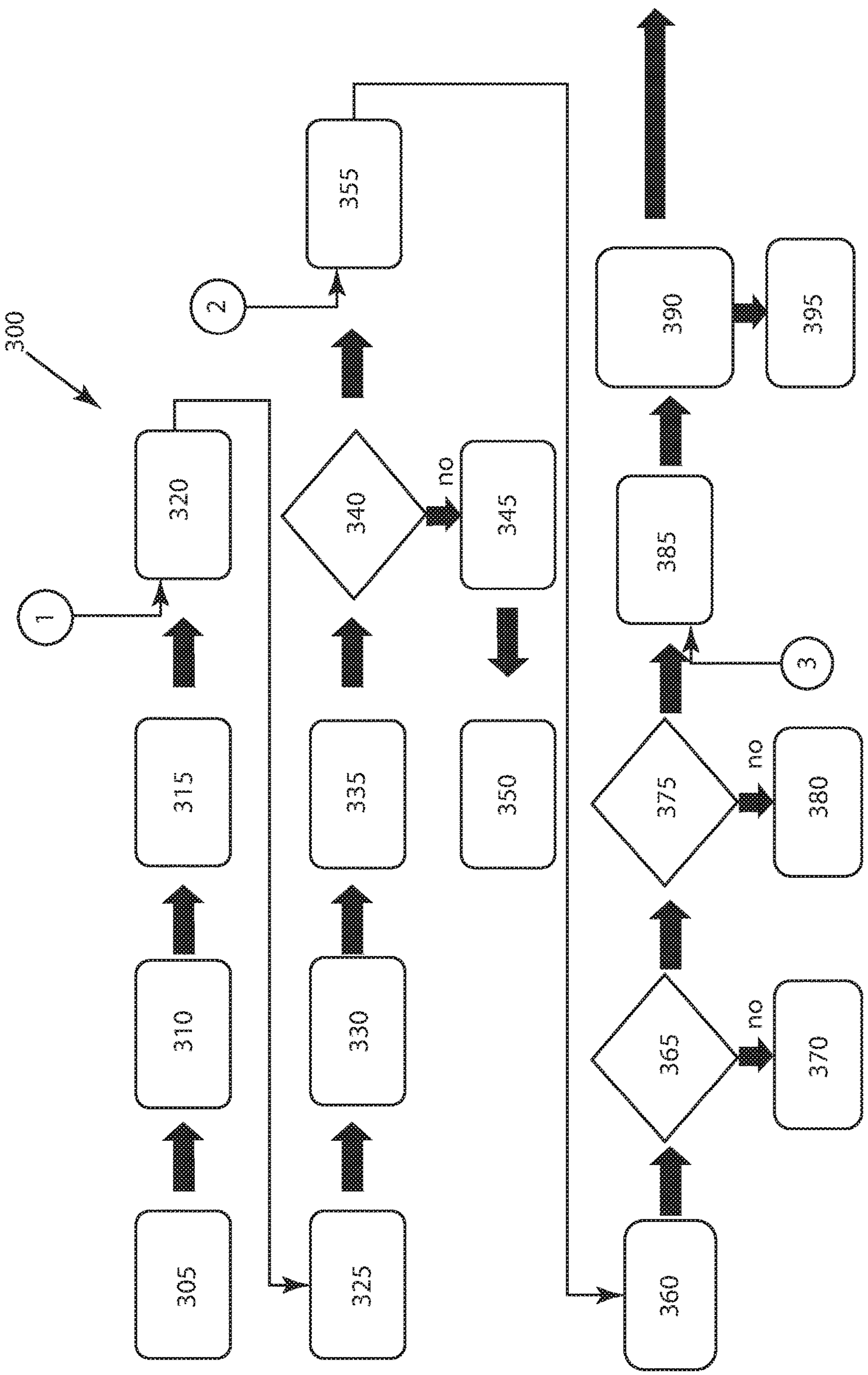
FIG. 8 is a flowchart illustrating steps in an exemplary method for operating an exemplary emission reduction system.

FIG. 8 is a flowchart illustrating steps in an exemplary method 300 for operating the emission reduction system 200.

In step 305, an initial flow of exhaust gases or other oxygen-containing gas stream is established through the afterburner 205. This may be accomplished by diverting a portion of the exhaust stream through the afterburner via a control valve 260, or by operating another port to provide such flow to the afterburner 205. The flow rate is then measured in step 310 and baseline values of various sensor readings are established in step 315. Station 1 marks the next phase of the method where fuel is then introduced into the afterburner 205 at step 320 and metered at step 325 taking into account the flow rate and other sensor readings to arrive at a mass-based Fuel-Air-Ratio (FAR) level that is appropriate for ignition within the afterburner combustion chamber.

Once the appropriate FAR has been established, after a short time such as fewer than about 5 seconds, at step 330 the ignition source is activated to start combustion in the afterburner combustion chamber. At step 335, sensors are operated to detect if a flame has been established. Detection may be made by observing a significant and sustained departure from baseline sensor values obtained at step 315. Various sensor types may be utilized to verify presence of a flame and active combustion, such as a flame detector, an oxygen sensor, an acoustic sensor to detect a change in the character of the tone of flow through the afterburner, and/or a carbon dioxide (CO2) sensor. At step 340 a decision point is reached. If a flame and successful combustion initiation are not achieved, the fuel flow is stopped at step 345 and the method returns from step 350 to Station 1 where the method repeats at step 320. If a flame and successful combustion initiation are achieved, and a flame has been established within the afterburner, Station 2 is reached and progressively more exhaust gas flow is routed from the bypass through the afterburner at step 355. In parallel with step 355, the FAR is monitored to ensure stable combustion and fuel is added at step 360 on an as-needed basis to maintain the target FAR and stable combustion. At step 365, the FAR is measured to ensure it is in the target range, and if not, the method returns to Station 2 where steps 355 and 360 are repeated to increase exhaust flow and fuel flow in suitable proportions. If the FAR is in the target range at step 365, then at step 375 the system queries the status of the bypass diverter valve to determine if it is fully closed to divert full exhaust flow through the afterburner 205. If flow is still being diverted through the bypass pipe, the method returns from step 380 to Station 2 where steps 355 and 360 are repeated to increase exhaust flow and fuel flow in suitable proportions.

Once step 375 verifies that the bypass valve is fully closed and all exhaust products from the internal combustion engine 100 are passing through the afterburner 205, Station 3 is achieved and at step 385 the fuel flow into the afterburner combustion chamber 245 is adjusted for optimum reduction in oxygen levels in the final exhaust output stream, and hence optimum NOx reduction. At step 390 sensor values in the final exhaust output stream are measured to confirm the desired level of emission reductions. Confirmation that the optimum level has been achieved can be observed by noting the value of the oxygen sensor which should be reading less than about 1%, and more particularly less than about 0.1%. If the optimum levels have not been achieved, step 395 directs the method back to Station 3 where the fuel input to the afterburner combustion chamber 245 is again adjusted for optimum NOx reduction.

Method 300, as described above, may be performed after the internal combustion engine 100 has been started and a flow of exhaust gas has been established and metered to create an initial flow through the afterburner 205. Alternatively, method 300 may also be performed prior to starting the internal combustion engine 100 using an initial flow of ambient air or other oxygen-containing gas stream introduced into the combustion chamber 245 such as via inlet 190 or other suitable means. In either method of operation, the primary exhaust flow from the internal combustion engine 100 is metered appropriately to transition to a full-flow state with all exhaust flow flowing through the afterburner 205 to achieve the greatest degree of oxygen level reduction in the final exhaust stream.

Figure 9:
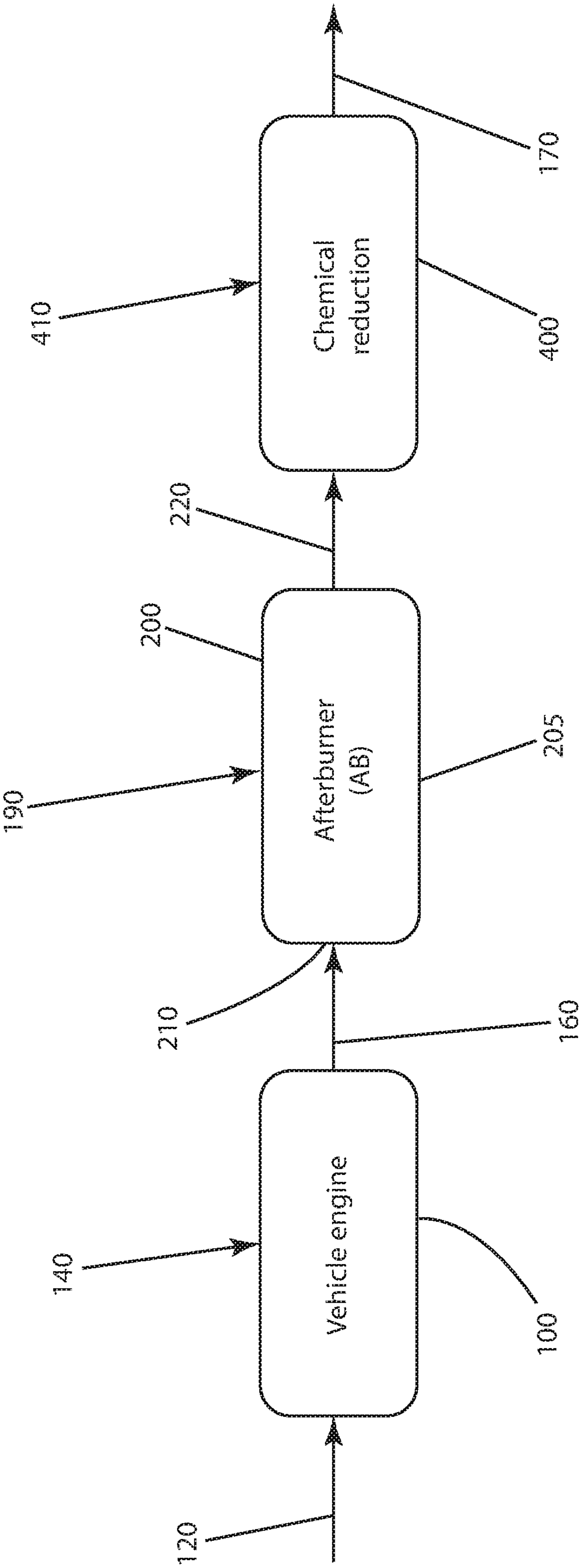
FIG. 9 is a schematic diagram of an exemplary embodiment of the system described herein installed with an internal combustion engine and incorporating a chemical reduction system.

FIG. 9 is a schematic diagram of an exemplary embodiment of the system described herein installed with an internal combustion engine and incorporating a chemical reduction system. The embodiment of FIG. 9 is similar to the embodiment of FIG. 5, and like reference numerals identify like elements, but in this embodiment an additional device or component 400 is added in series downstream of the afterburner 205 to perform a selective non-catalytic reduction (SNCR) reaction to further reduce NOx levels in the final exhaust stream. SNCR reactions are known and may incorporate NH3 or other ingredients 410, such as DEF, urea, and the like, to reduce NOx pollutants within the exhaust stream at the outlet of the afterburner 205.

DEF is a reduction agent which can be utilized in both catalytic (selective catalytic reduction (SCR)) and SNCR applications. With SNCR, conventional gas-phase reactions react the DEF with the combustion products and use the NH2 from the DEF to move NOx to N2 (equations from FIG. 1), as the flame in the afterburner provides the temperature that drives the reactions forward. In SCR, on the other hand, the catalyst promotes the reactions without the presence of a flame and acts to lower the activation energy of the reactions. Thus, they move forward at lower temperatures and do not require a flame (or other temperature source) to drive them to completion. The use of an afterburner such as described herein eliminates the need for a catalyst by approaching the problem differently.

Figure 10:
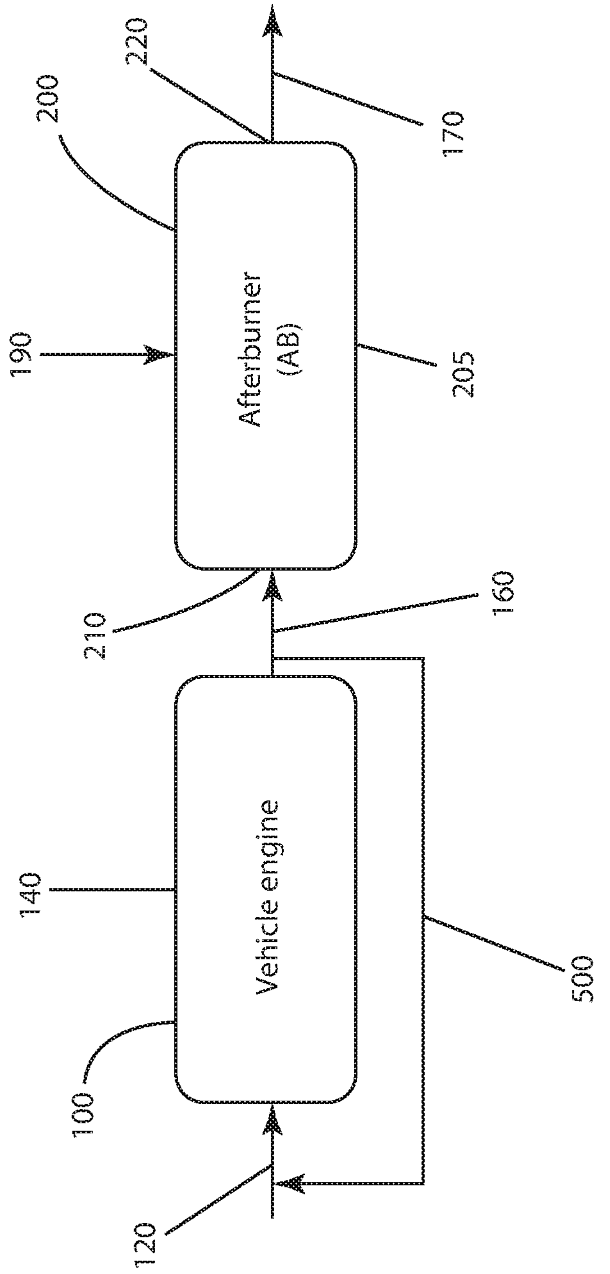
FIG. 10 is a schematic diagram of an exemplary embodiment of the system described herein installed with an internal combustion engine and incorporating an exhaust gas recirculation system.

FIG. 10 is a schematic diagram of an exemplary embodiment of the system described herein installed with an internal combustion engine and incorporating an exhaust gas recirculation system. The embodiment of FIG. 10 is similar to the embodiment of FIG. 5, and like reference numerals identify like elements, but in this embodiment an additional device or component 500 in the form of an exhaust gas recirculation (EGR) system is added to recirculate a portion of the exhaust stream emitted by the internal combustion engine 100 back into the intake system to reduce the oxygen levels in the primary combustion chambers within the internal combustion engine. This may aid in the reduction of oxygen levels in the exhaust stream and enable a smaller afterburner 205 to be utilized, or to have reduced levels of fuel required for the secondary combustion process taking place in the secondary combustion chamber 245.

Figure 11:
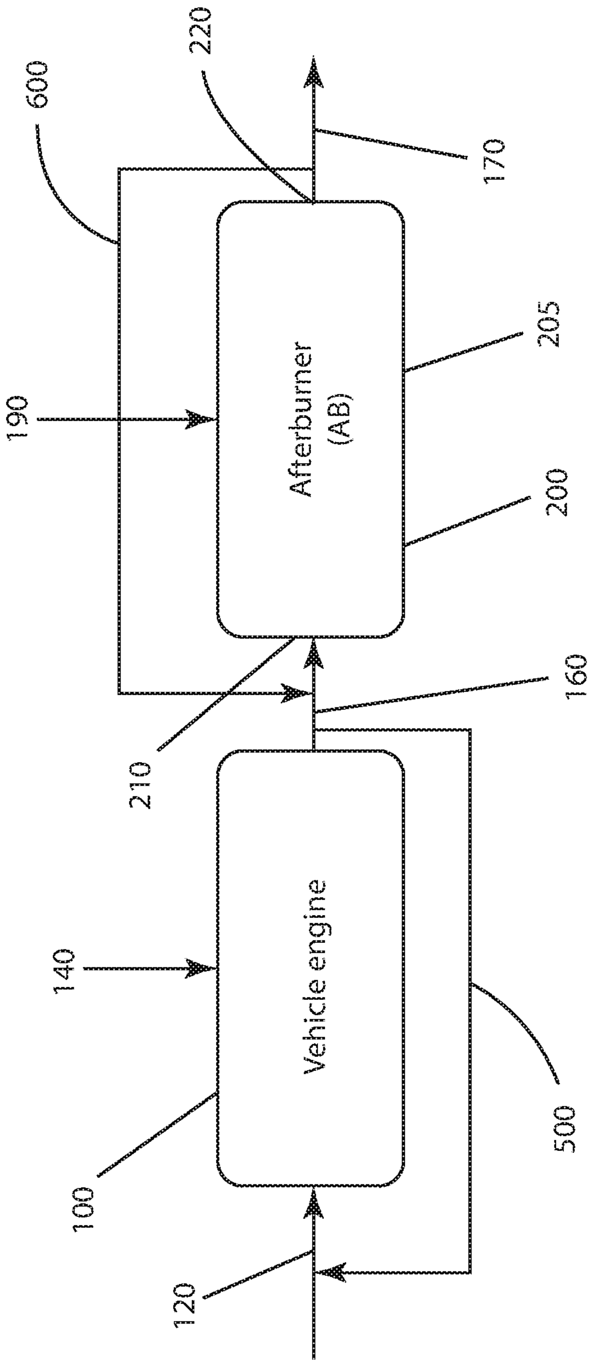
FIG. 11 is a schematic diagram of an exemplary embodiment of the system described herein installed with an internal combustion engine and incorporating two exhaust gas recirculation systems.

FIG. 11 is a schematic diagram of an exemplary embodiment of the system described herein installed with an internal combustion engine and incorporating two exhaust gas recirculation systems. The embodiment of FIG. 11 is similar to the embodiment of FIG. 10, and like reference numerals identify like elements, but in this embodiment an additional device or component 600 in the form of a second exhaust gas recirculation (EGR) system is added to recirculate a portion of the exhaust stream emitted by the afterburner 205 back into the inlet of the afterburner 205 to reduce the oxygen levels entering the secondary combustion chamber 245. This may enable a smaller afterburner 205 to be utilized, or to have reduced levels of fuel required for the secondary combustion process taking place in the secondary combustion chamber 245.

The EGR systems described with respect to FIGS. 10 and 11 may be employed singly or in combination as desired in order to achieve the overall system objectives of essentially zero oxygen levels at the exit of the overall system. In other words, one loop 500 may be employed to return exhaust gas to the engine inlet to be recirculated, or one loop 600 may be employed to return exhaust gas to the afterburner inlet to be recirculated, or two loops 500 and 600 may be employed to recirculate exhaust gas through both components.

Figure 12:
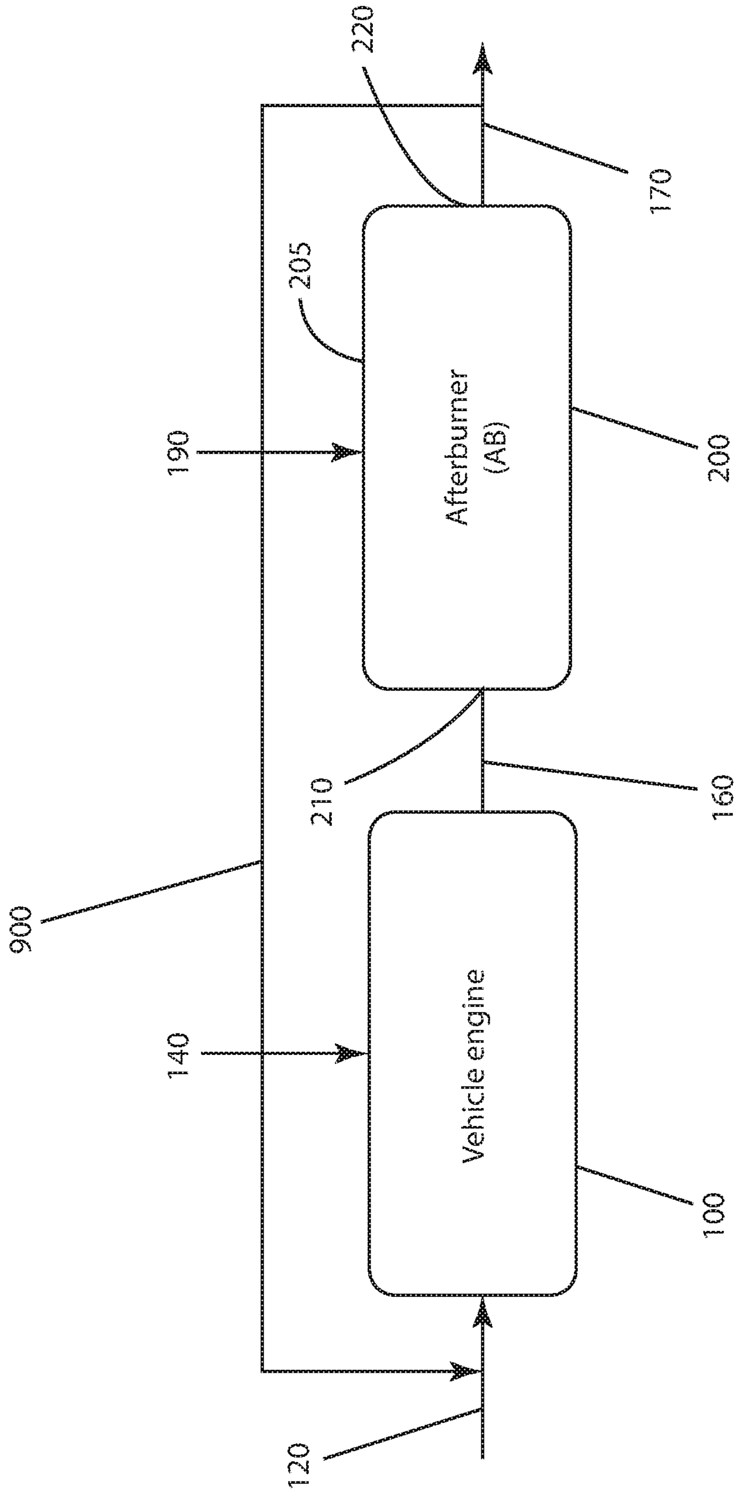
FIG. 12 is a schematic diagram of another exemplary embodiment of the system described herein installed with an internal combustion engine and incorporating an exhaust gas recirculation system

FIG. 12 is a schematic diagram of another exemplary embodiment of the system described herein installed with an internal combustion engine and incorporating an exhaust gas recirculation system. The embodiment of FIG. 12 is similar to the embodiment of FIG. 5, and like reference numerals identify like elements, but in this embodiment an additional device or component 900 in the form of an exhaust gas recirculation (EGR) system is added to recirculate a portion of the exhaust stream emitted by the afterburner 205 back into the intake system of the internal combustion engine 100 to reduce the oxygen levels in the primary combustion chambers within the internal combustion engine. This may aid in the reduction of oxygen levels in the exhaust stream and enable a smaller afterburner 205 to be utilized, or to have reduced levels of fuel required for the secondary combustion process taking place in the secondary combustion chamber 245.

Figure 13:
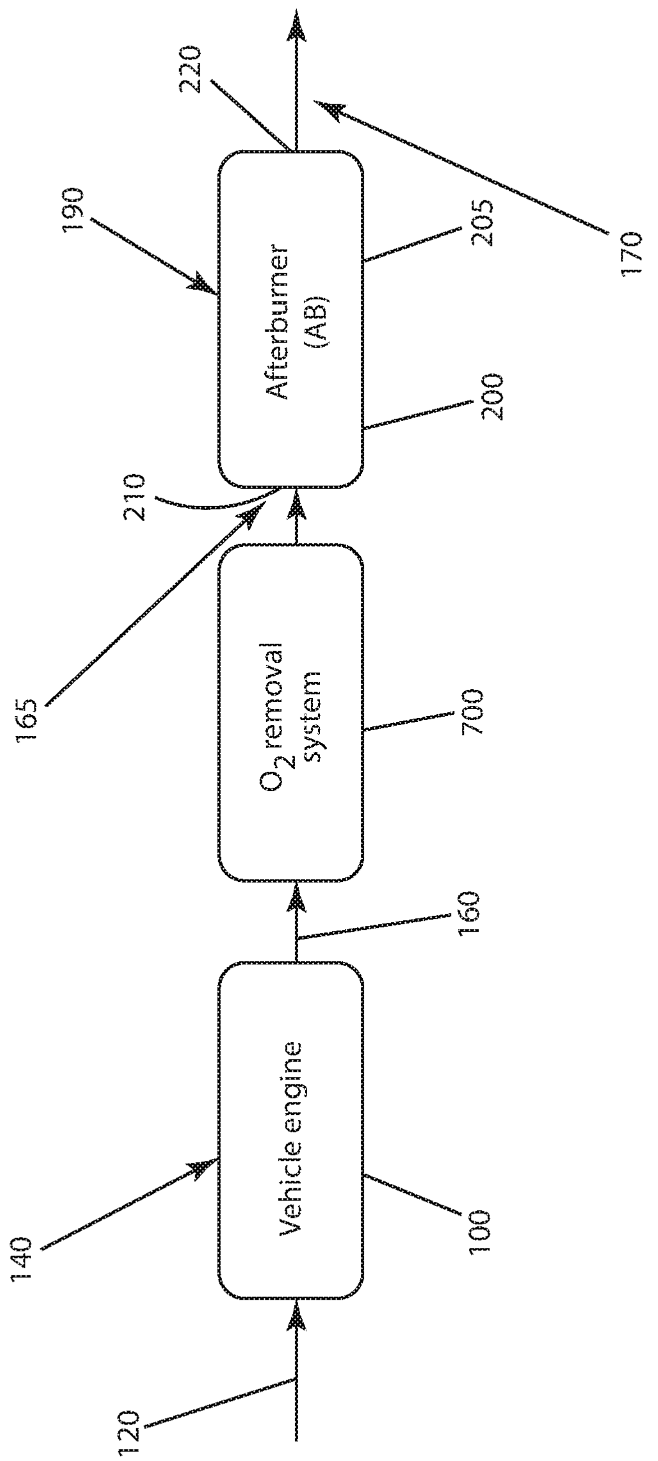
FIG. 13 is a schematic diagram of an exemplary embodiment of the system described herein installed with an internal combustion engine and incorporating an oxygen removal system between the internal combustion engine and the emission reduction system.

FIG. 13 is a schematic diagram of an exemplary embodiment of the system described herein installed with an internal combustion engine 100 and incorporating an oxygen removal system 700 between the internal combustion engine 100 and the emission reduction system 200. The embodiment of FIG. 13 is similar to the embodiment of FIG. 5, and like reference numerals identify like elements, but in this embodiment an additional device or component 700 in the form of an oxygen removal system is added upstream of the internal combustion engine 100 to reduce the oxygen levels in the air 125 entering the intake system of the internal combustion engine 100, thus reducing the oxygen levels in the primary combustion chambers within the internal combustion engine. This may aid in the reduction of oxygen levels in the exhaust stream and enable a smaller afterburner 205 to be utilized, or to have reduced levels of fuel required for the secondary combustion process taking place in the secondary combustion chamber 245.

One example of a suitable oxygen removal system 700 would be a membrane separation system which would segregate some amount of oxygen from the incoming stream and thus reduce the oxygen content that is ultimately fed to the afterburner. The membrane need not be 100% effective at removing oxygen, as, for example, even a 50% reduction in oxygen in the stream fed into the separation unit would be very effective in reducing the overall fuel burn in the afterburner. Such separation systems could be designed to manage considerations such as flow rate and pressure drop, along with operating temperatures including pre-cooling, if required.

Figure 14:
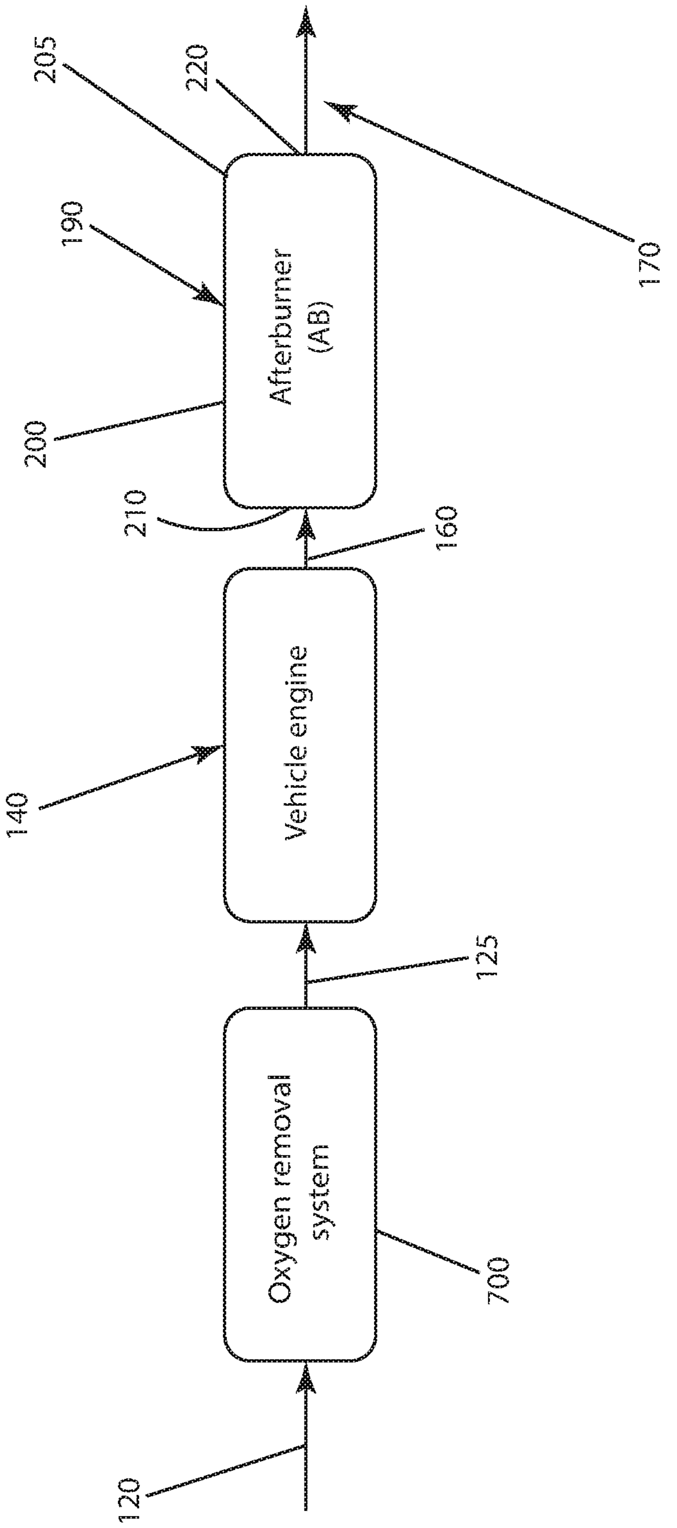
FIG. 14 is a schematic diagram of an exemplary embodiment of the system described herein installed with an internal combustion engine and incorporating an oxygen removal system upstream of the internal combustion engine.

FIG. 14 is a schematic diagram of an exemplary embodiment of the system described herein installed with an internal combustion engine 100 and incorporating an oxygen removal system 700 upstream of the internal combustion engine 100. The embodiment of FIG. 14 is similar to the embodiment of FIG. 13, and like reference numerals identify like elements, but in this embodiment the additional device or component 700 in the form of an oxygen removal system is added between the internal combustion engine 100 and the afterburner 205 to reduce the oxygen levels in the air 165 entering the afterburner 205, thus reducing the oxygen levels in the secondary combustion chamber 245. This may aid in the reduction of oxygen levels in the exhaust stream and enable a smaller afterburner 205 to be utilized, or to have reduced levels of fuel required for the secondary combustion process taking place in the secondary combustion chamber 245.

While the description above has focused on configurations having a single afterburner 205, it is contemplated that emission reduction systems 200 may be designed with a plurality of afterburners 205 and a plurality of secondary combustion chambers 245, either in parallel with divided exhaust streams or in series to achieve a staged reduction in oxygen levels prior to the final exit of the exhaust stream from the system. Such staged systems may employ similarly sized and constructed afterburner systems, or they may be sized differently to perform different levels of oxygen reduction in each stream or stage.

Components of the emission reduction system described herein may be manufactured by any suitable manufacturing techniques using any suitable materials for the environment, operating conditions, and installation location required. Some components, such as the combustion chamber and fuel delivery devices, for example, may be advantageously manufactured using additive manufacturing techniques. Suitable manufacturing techniques and materials will be apparent to those of ordinary skill in the art.

Other features, such as particle separators or filters, may also be incorporated into the emission reduction system as a combined unit, or may be incorporated into the downstream exhaust piping network leading from the internal combustion engine to the atmosphere.

It should be appreciated that application of the disclosed design is not limited to land based vehicles with reciprocating engines, but may have general applicability, including other mobile and non-mobile industrial, commercial, and residential applications such as aircraft, ships, railroad locomotives, off-road vehicles, and stationary powerplants. Other internal combustion engine types besides reciprocating engines may also be included within scope, such as gas turbine engines. It should also be further appreciated that while embodiments described herein have a given orientation the embodiments can be positioned in other directions and/or orientations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A system for reducing emissions from an internal combustion engine, comprising:

an afterburner having an inlet and an outlet, the inlet downstream of the internal combustion engine;

a fuel delivery device for delivering fuel to the afterburner;

a control system for controlling a fuel to oxidizer ratio in the afterburner; and a valve positioned upstream of the inlet and operably coupled with the control system, wherein the control system meters an amount of an exhaust gas from the internal combustion engine that is provided to the afterburner based at least in part on a state of a first fuel tank operably coupled with the internal combustion engine and a second, separate fuel tank operably coupled with the afterburner downstream of the internal combustion engine.

2. The system of claim 1, wherein the control system is in communication with the fuel delivery device for regulating an amount of the fuel to be delivered to the afterburner to minimize oxygen levels in the exhaust gas at the outlet.

3. The system of claim 1, wherein the control system includes an oxygen sensor in communication with reactants or products of a combustion process in the afterburner for sensing oxygen levels in the exhaust gas.

4. The system of claim 3, wherein the system further includes an upstream oxygen sensor located at or near the inlet and connected to the control system.

5. The system of claim 3, wherein the system further includes a downstream oxygen sensor located at or near the outlet and connected to the control system.

6. The system of claim 1, wherein the system further includes a selective non-catalytic reduction (SNCR) system upstream or downstream of the afterburner.

7. The system of claim 1, wherein the fuel delivery device is a fuel nozzle, an atomizing fuel nozzle, or a fuel injector.

8. The system of claim 1, wherein the system further includes an exhaust gas recirculation (EGR) duct for returning a portion of the exhaust gas from the outlet to the inlet.

9. An internal combustion engine having reduced emissions output, comprising:

an exhaust gas system;

a first fuel source for providing fuel to the internal combustion engine; and an emission reduction system for reducing emissions from the exhaust gas system, the emission reduction system comprising:

an afterburner having an inlet and an outlet;

a fuel delivery device located within the afterburner, the fuel delivery device receiving fuel from a second fuel source that is stored separately from the first fuel source;

a control system connected to the fuel delivery device for regulating an amount of fuel to be dispensed into the afterburner to reduce oxygen levels in exhaust gases at the outlet; and a bypass system including a bypass pipe fluidly connected to an exhaust pipe upstream of the emission reduction system and to an exhaust stack downstream of the emission reduction system, the bypass system further including a valve configured to control a variable amount of exhaust flow provided to the afterburner of the emission reduction system and the bypass pipe of the bypass system.

10. The internal combustion engine of claim 9, wherein the emission reduction system further includes an exhaust gas recirculation (EGR) duct for returning a portion of the exhaust gases from the outlet to the inlet.

11. The internal combustion engine of claim 9, wherein the emission reduction system further includes a selective non-catalytic reduction (SNCR) system upstream or downstream of the afterburner.

12. The internal combustion engine of claim 9, wherein the emission reduction system further includes an exhaust gas recirculation (EGR) duct for returning a portion of the exhaust gases from the outlet to the internal combustion engine.

13. The internal combustion engine of claim 9, wherein the emission reduction system further includes an exhaust gas recirculation (EGR) duct for returning a portion of the exhaust gases from the internal combustion engine to the internal combustion engine.

14. The internal combustion engine of claim 9, wherein the control system includes an oxygen sensor in communication with reactants or products of a combustion process in the afterburner for sensing oxygen levels in the exhaust gases.

15. A vehicle having reduced emissions output, comprising:

an internal combustion engine;

an exhaust pipe fluidly coupled with the internal combustion engine;

an oxygen removal system positioned upstream of the internal combustion engine and fluidly coupled with the exhaust pipe;

an emission reduction system for reducing emissions from the internal combustion engine operably coupled with the exhaust pipe downstream of the oxygen removal system, wherein the emission reduction system comprises:

an afterburner having an inlet and an outlet;

a fuel delivery device for delivering fuel to the afterburner; and a control system connected to the fuel delivery device for regulating an amount of fuel to be delivered to the afterburner to reduce oxygen levels in exhaust gases at the outlet; and a bypass system including a bypass pipe fluidly connected to the exhaust pipe upstream of the emission reduction system and to an exhaust stack downstream of the emission reduction system, the bypass system further including a valve configured to control a variable amount of exhaust flow provided to the afterburner of the emission reduction system and the bypass pipe of the bypass system.

16. The vehicle of claim 15, wherein the internal combustion engine is a diesel engine and the vehicle is a land based vehicle.

17. A method of reducing emissions from an internal combustion engine, the method comprising the steps of:

establishing a flow of ambient air into an afterburner having a first inlet and an outlet, the flow of the ambient air provided through a second inlet separated from the first inlet;

developing a stream of exhaust gas by initiating operation of the internal combustion engine;

establishing an exhaust flow of the exhaust gas through the afterburner;

introducing a fuel flow of fuel into the afterburner, igniting the fuel in the afterburner; and actuating a valve to control the exhaust flow through a bypass system including a bypass pipe fluidly connected to an exhaust pipe upstream of an emission reduction system and to an exhaust stack downstream of the emission reduction system, wherein a variable amount of exhaust flow is provided to the afterburner and the bypass pipe of the bypass system, wherein the step of controlling the exhaust flow of the exhaust gas and the fuel flow of fuel is accomplished by controlling a fuel air ratio (FAR).

18. The method of claim 17, wherein the step of establishing an exhaust flow of the exhaust gas utilizes a bypass system.

19. The method of claim 17, further comprising:

detecting combustion in the afterburner.

20. The method of claim 17, further comprising:

sensing oxygen levels in the exhaust gas.

21. The method of claim 17, wherein the step of introducing fuel involves pre-mixing fuel with the exhaust flow of exhaust gas.

22. The method of claim 17, further comprising:

performing a selective non-catalytic reduction (SNCR) reaction.

23. The method of claim 17, further comprising:

introducing supplemental oxygen downstream of the afterburner to reduce levels of carbon monoxide (CO).

24. The method of claim 17, further comprising:

utilizing a bypass conduit.

* * * * *